(No Model.)

J. A. HENCKELS.
BUTTON HOLE SCISSORS.

No. 398,509. Patented Feb. 26, 1889.

Witnesses:
Gustave Albert Oelrichs
G. Adolf Hardt.

Inventor:
per Johann Albert Henckels:
Attorney

UNITED STATES PATENT OFFICE.

JOHANN ALBERT HENCKELS, OF SOLINGEN, GERMANY.

BUTTON-HOLE SCISSORS.

SPECIFICATION forming part of Letters Patent No. 398,509, dated February 26, 1889.

Application filed September 8, 1888. Serial No. 284,967. (No model.)

*To all whom it may concern:*

Be it known that I, JOHANN ALBERT HENCKELS, manufacturer, a citizen of the Kingdom of Prussia, and a resident of Solingen, Rhenish Prussia, Germany, have invented a new and useful Improvement in Button-Hole Scissors, of which the following is a specification.

The hereinafter-described improvement has for its purpose to prevent a dislocation of the screw $a$, serving to fix the size of the button-hole, and also to prevent the wear of the screw-thread and its uselessness. For preventing these inconveniences, I use a conical box or nut, $b$, the inner thread of which serves for the reception of the screw $a$, while the outer thread is screwed in a corresponding hole or opening of one of the scissors-legs. This conical nut $b$ is slotted in the direction of its longitudinal axis, and is provided on its under side with an opening, $d$, to enable the two halves of the slotted nut to feather or to be contracted. By means of this contraction is operated as well the tightening of the adjusting-screw $a$, and I can use the contracted opening of $b$ for maintaining the screw when worn—viz., to use the screw again and again. After having adjusted the screw $a$ conformably to the size of the button-hole I drive the conical nut, whereby the screw $a$, in consequence of the entering of this nut in the conical opening of the scissors-leg, is rigidly secured. In case the threads of the screw $a$ are worn, there may be obtained a good working of the same by contracting the nut $b$.

Figure 2:
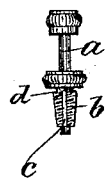

In lieu of the adjusting-screw $a$, one may use, also, as represented in Figure 2, a single flat pin, $a$, which is inserted in the non-threaded opening of the feathering-nut $b$, only provided with an outer thread.

Figure 1:
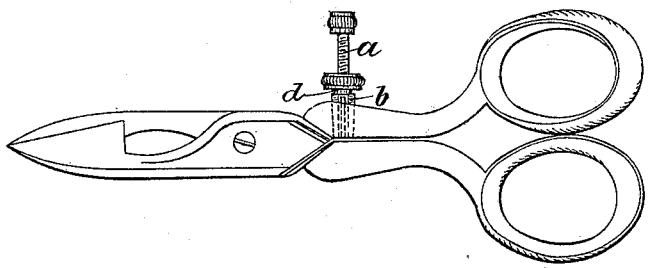
Figure 3:
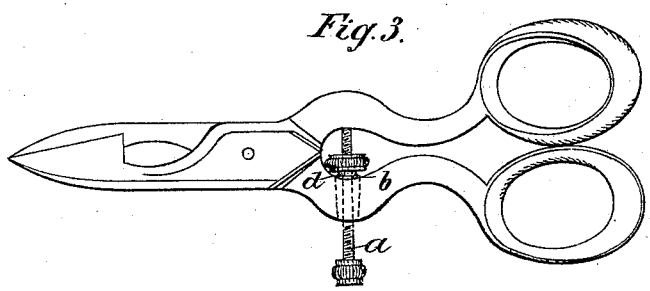

Fig. 1 represents the head of the nut $b$ outward of the scissors-legs. In lieu of this arrangement the head may be also placed, as represented in Fig. 3, between the scissors-legs.

What I claim as new, and wish to secure by Letters Patent of the United States, is—

In a pair of button-hole scissors, the combination of the adjusting-pin $a$, the conical slotted nut $b$, having a small neck, the said nut being screwed into one of the arms of the scissors, substantially as described, and for the purpose set forth.

In testimony that I claim the foregoing as my invention I have signed my name in presence of two subscribing witnesses.

JOHANN ALBERT HENCKELS.

Witnesses:
   GUSTAVE ALBERT OELRICHS,
   G. ADOLF HARRDT.